(No Model.) 2 Sheets—Sheet 1.

E. MAERTENS.
TENSION REGULATING DEVICE FOR DRIVING BANDS OF SPINNING MACHINES.

No. 409,412. Patented Aug. 20, 1889.

Witnesses:
Alex. Barkoff
William D. Conner

Inventor
Emile Maertens
By his Attorneys Howson & Son (No Model.) 2 Sheets—Sheet 2.
E. MAERTENS.
TENSION REGULATING DEVICE FOR DRIVING BANDS OF SPINNING MACHINES.
No. 409,412. Patented Aug. 20, 1889.
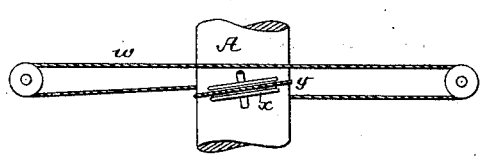
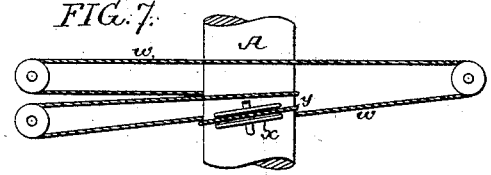
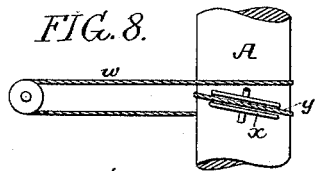
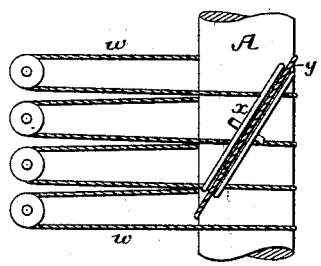
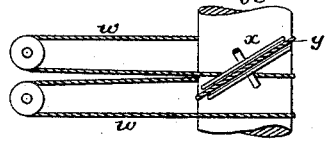
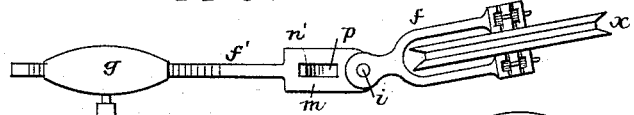
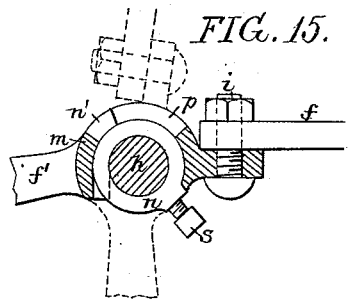
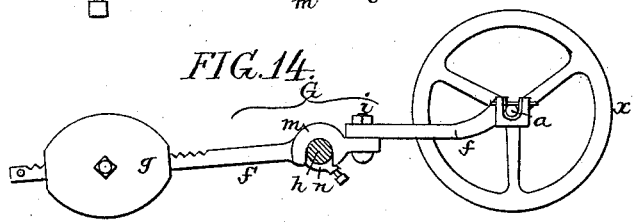
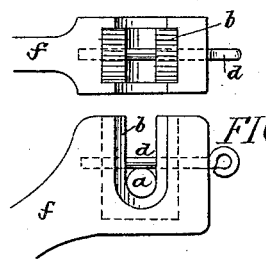
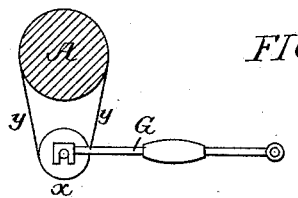
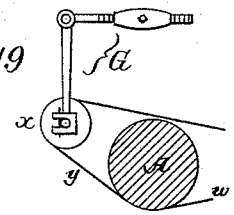
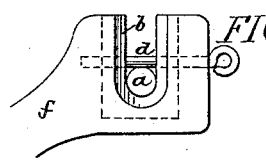
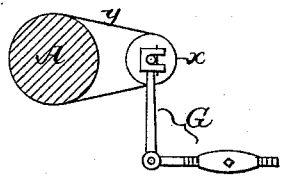
Witnesses
Alex. Barkoff
William D. Conner.
Inventor
Emile Maertens
By his Attorney Howson Son

UNITED STATES PATENT OFFICE.

EMILE MAERTENS, OF PROVIDENCE, RHODE ISLAND.

TENSION-REGULATING DEVICE FOR DRIVING-BANDS OF SPINNING-MACHINES.

SPECIFICATION forming part of Letters Patent No. 409,412, dated August 20, 1889.

Application filed April 27, 1887. Serial No. 236,300. (No model.) Patented in England May 7, 1887, No. 6,746; in France November 28, 1887, No. 187,254, and in Belgium December 1, 1887, No. 79,749.

*To all whom it may concern:*

Be it known that I, EMILE MAERTENS, a citizen of the United States, and a resident of Providence, Rhode Island, have invented certain Improvements in Tension Devices for the Driving-Bands of Spinning-Machines, (for which I have obtained British Letters Patent No. 6,746, dated May 7, 1887; French Letters Patent No. 187,254, dated November 28, 1887, and Belgian Letters Patent No. 79,749, dated December 1, 1887,) of which the following is a specification.

One object of my invention is to provide a cheap and practicable plan of converting an ordinary spinning or twisting frame, mule, or like piece of machinery from a "single-drive" machine to a "multiple-drive" machine— that is to say, from a machine in which a separate driving-band is employed for each spindle to one in which a single band is used for driving a series or set of spindles, a further object being to so construct a tension device for the band and to so apply the same to said band that no material deflection of the latter will be caused by the action of the tension device thereupon.

Figure 1:
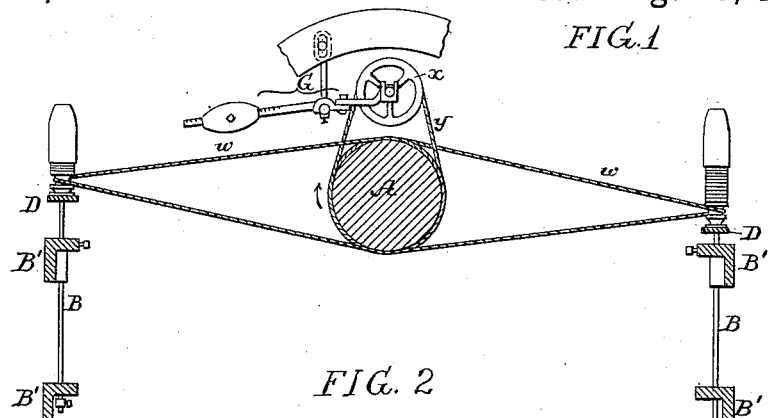
Figure 2:
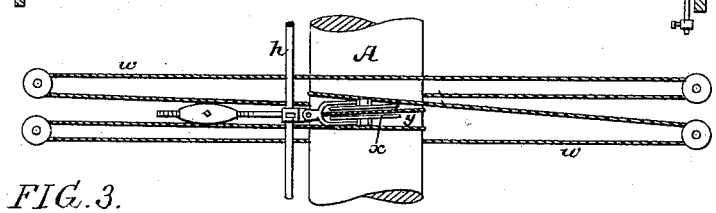
Figure 3:
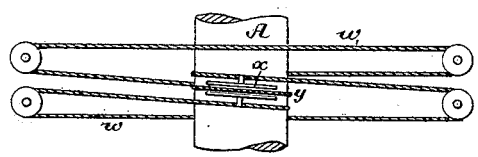
Figure 4:
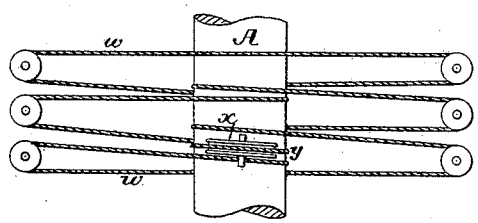
Figure 5:
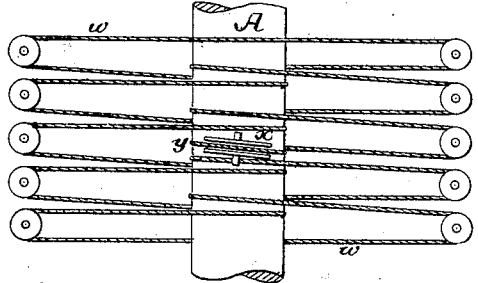

In the accompanying drawings, Figure 1 is a transverse section, partly in elevation, and Fig. 2 a plan view, of sufficient of a spinning or twisting frame to illustrate my invention; Figs. 3, 4, and 5, views illustrating different plans of multiple banding in accordance with the invention; Figs. 6 to 12, inclusive, views showing other forms of banding with which my improved tension device can be used; Figs. 13 to 17, inclusive, enlarged views of the tension device; and Figs. 18 to 20, views showing modified forms of the same.

The majority of spinning and twisting frames at present in use have the driving-drum midway between the opposite rows of spindles and with its axis in a horizontal plane in line with the whirls of the opposite spindles, when the latter are fixed, or in a plane midway of the limits of movement of the whirls when the spindles reciprocate, a special driving-band for each spindle being employed. This common method of driving the spindles is open to many objections, and in order that my invention may be better understood I will at the outset briefly allude to the requirements necessary for proper spinning or twisting. In the first place, a certain amount of tension on the driving-band is required in order that the spindle may be driven at its proper speed, a lack of proper tension causing loss of twist in the yarn, as well as wear of the band, due to the slipping of the same on the driving-drum or spindle-whirl, while on the other hand excessive tension is accompanied by a corresponding excessive consumption of power and lubricant and undue wear upon the machinery. When a single band for each spindle is employed, the tension upon the bands varies with almost every spindle, and the bands tighten and slacken in accordance with the variations of temperature or hygrometric condition of the atmosphere in the mill. The bands are frequently tied up in the wrong way and allowed to run in this manner for some time before detection, thus causing wrong twist in the yarns and serious loss, either because of waste or from working such defective yarn up into cloth. Waste due to slack-twisted yarns is also a considerable item of loss in a large mill, and when the driving-band becomes slack it must be replaced, and in most cases is unfit for further use. Most of these objections may be overcome or materially lessened by a system of multiple driving—that is to say, a system in which a series of spindles are driven by a single band—for by this means not only is the extent of possible variation in the working of the spindles reduced, because of the less number of independent driving-bands employed, but provision is afforded for using a tension device for each band, a plan which cannot be advantageously adopted when there is a separate band for each spindle, because of the excessive number of tension devices which would be necessary in such case, with the accompanying excessive wear and excessive consumption of power and lubricant in running the machine. So far as I am aware, however, no simple, cheap, and practicable plan of multiple drive and tension device has been heretofore devised for use in connection with machines having the driving-drum and spindles located as in the present single-drive machines, and as shown, for instance, in Fig. 1, and my invention has for its object the provision of such means, so that the ordinary machines can at slight expense be changed to practical multiple-drive machines.

In Figs. 1 and 2, A represents the central driving-drum of a spinning or twisting frame; B B, the opposite spindles; B' B', the spindle-rails; D D, the lifter-rails, and $w$ the driving-band adapted to the driving drum and to the whirls of the spindles.

I arrange the spindles in sets, each set comprising a series of spindles (preferably not more than four) on each side of the machine, and I carry the band over and in contact with the drum in crossing from one series of spindles to the other at one end of the set, and under and in contact with the drum in passing from series to series at the opposite end of the set, and I apply a tension device to the band at such point that it will not interfere with the driving contact between the drum and band at the points where the latter crosses the drum. By this means I avail myself of the driving contact of the band with the drum at each end of the set of spindles, and I am enabled to use in connection with the band a direct-acting tension-pulley carried by a weighted compensating lever, and dispense with all carrying-pulleys, which are indispensable if any attempt is made to impart tension to the band where it crosses from one series to the other at one end of the set. When the spindles are stationary, the tension-pulley may act upon the band at a point between the drum and the spindle; but when the spindles reciprocate I use a tension-pulley $x$, acting upon a special loop $y$ of the band $w$, this loop extending from the drum to the pulley and then back to the drum, as by this arrangement all deflection of the band between the drum and spindles is avoided, and the tendency of the band to leave the whirl on account of such deflection of the band is effectually overcome.

Figs. 3, 4, and 5 show my improved plan of banding and tension device applied, respectively, to four, six, and ten spindles.

The improved form of tension device may, however, be used in connection with a band employed for driving a less number of spindles than four. For instance, Fig. 6 shows a two-spindle arrangement—one spindle being located at each side of the machine—and Fig. 7 shows three spindles—two on one side of the drum and one on the opposite side.

The tension device may also be employed with advantage when the spindle or series of spindles driven by the band is at one side of the drum, Figs. 8, 9, and 10 showing, respectively, one, two, and four spindles arranged in this manner.

When a series of spindles at one side of the drum is driven in this manner, the tension-pulley is arranged at an angle, so as to carry the band from one end of the series to the other, as shown in Figs. 9 and 10.

Figure 11:
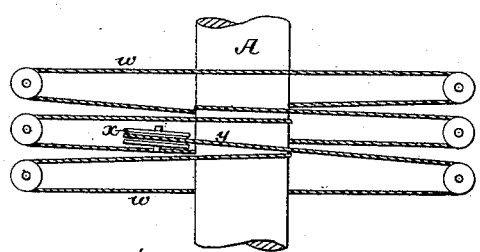
Figure 12:
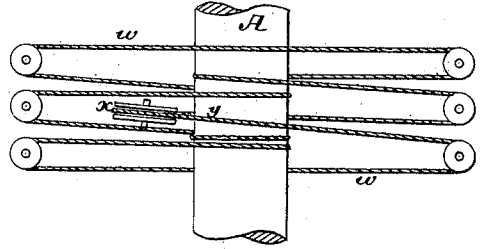

If desired, the special loop $y$, to which the tension-pulley $x$ is adapted, may be of the character shown in Figs. 11 and 12—that is to say, the band may pass from a spindle to and in contact with the drum, and then directly to a side tension-pulley and back from the same to and in contact with the drum, and thence to the spindle, as in Fig. 11. This lessens the extent of driving-contact of the drum and band as compared with the other plans shown; but, if desired, this can be compensated for by giving the band an extra turn around the drum at any convenient point, as shown, for instance, in Fig. 12.

The tension device which I prefer to use is shown in Figs. 13 to 17.

The pulley $x$, which receives the tension-loop $y$ of the band $w$, has a shaft $a$, which is adapted to a recess in a block $b$ of wood, rawhide, or other material, providing a good bearing for the shaft, the latter being retained in position by a transverse pin $d$ or any other suitable means.

The bearing-block $b$ is adapted to the recessed outer end of one arm $f$ of the tension-lever G, the other arm $f'$ of which is provided with a suitable adjustable weight $g$. The lever G is hung to a transverse rod or shaft $h$, and the arm $f$ of the lever is made in two parts connected by a bolt $i$ at right angles to the line of the shaft $h$, so that said arm $f$ of the lever is free to swing in a plane at right angles to that in which the lever itself moves, whereby the tension-pulley $x$ is at liberty to accommodate itself to any angle which may be assumed by the tension-loop $y$ of the driving-band.

The hub $m$ of the lever G is notched, so that said lever can be dropped onto the pivot-rod or lifted therefrom with facility, and said hub is recessed for the reception of a ring $n$, secured to the pivot-rod $h$, a lug $n'$, projecting into a slot $p$ in the hub $m$ of the lever and serving by contact with the ends of said slot $p$ to limit the swinging movement of the tension-lever.

The ring $n$ is provided with a set-screw $s$, whereby it may be secured upon the pivot-rod $h$ in any desired position which the desired variations in the limit of the movement of the tension-lever may demand.

Although, as above remarked, this form of tension-lever is preferred, various forms of levers may be used in carrying out the main feature of my invention. For instance, in Fig. 18 I have shown a lever of a different order, having a weight adjustable between the fulcrum of the lever and the bearing of the tension-pulley, and in Figs. 19 and 20 I have shown tension-pulleys carried by bell-crank levers, a lever of the latter class being employed when the tension-pulley is located at one side of the driving-drum, as in Figs. 11 and 12.

The side tension-pulley $x$ may be so arranged that one limb of the special loop $y$ may be free from contact with the driving-drum, as shown, for instance, in Fig. 19, no material deflection of the belt resulting from this slight change. In all cases, however, the tension-pulley is applied to the band between two successive points of contact of said band—that is to say, either between two points of contact with the drum, or between a point of contact with the drum and a point of contact of said band with a spindle-whirl, instead of between two idler or carrier pulleys.

Having thus described my invention, I claim and desire to secure by Letters Patent—

1. The combination of a set of spindles comprising a row on each side of the machine, an intermediate driving-drum occupying a mid-plane in respect to the whirls, and a single band driving first one row and then the other row of said spindles, passing alternately around the drum and around a spindle-whirl and passing over and in contact with the drum in crossing from row to row at one end of the set and under and in contact with the drum in crossing from row to row at the opposite end of the set, and a tension device acting directly upon the band between two successive points of driving-contact of said band, substantially as specified.

2. The combination of a row of spindles, a driving-drum therefor, an endless band passing alternately around the drum and around a spindle-whirl, and having a special tension-loop formed by carrying the band outward from the drum and thence back to said drum, and a tension-pulley applied to said special tension-loop of the band, substantially as specified.

3. The combination of a row of spindles, a driving-drum therefor, a driving-band passing alternately around the drum and around a spindle-whirl, and a tension device located in a different horizontal plane from that of the drum and applied to the band in a loop extending from the drum, substantially as specified.

4. The combination of a series of spindles, a driving-drum therefor, a driving-band passing alternately around the drum and around a spindle-whirl, and a tension device applied to the band in a loop extending from the drum, the pulley of said tension device being inclined in respect to the axis of the drum, whereby it directs the band from the front of the drum at one end of the series of spindles to the rear of the drum at the opposite end of said series, substantially as specified.

In testimony whereof I have signed my name to this specification in the presence of two subscribing witnesses.

EMILE MAERTENS.

Witnesses:
B. RAY PHELON,
J. G. DOLBEL.